Patented June 11, 1929.

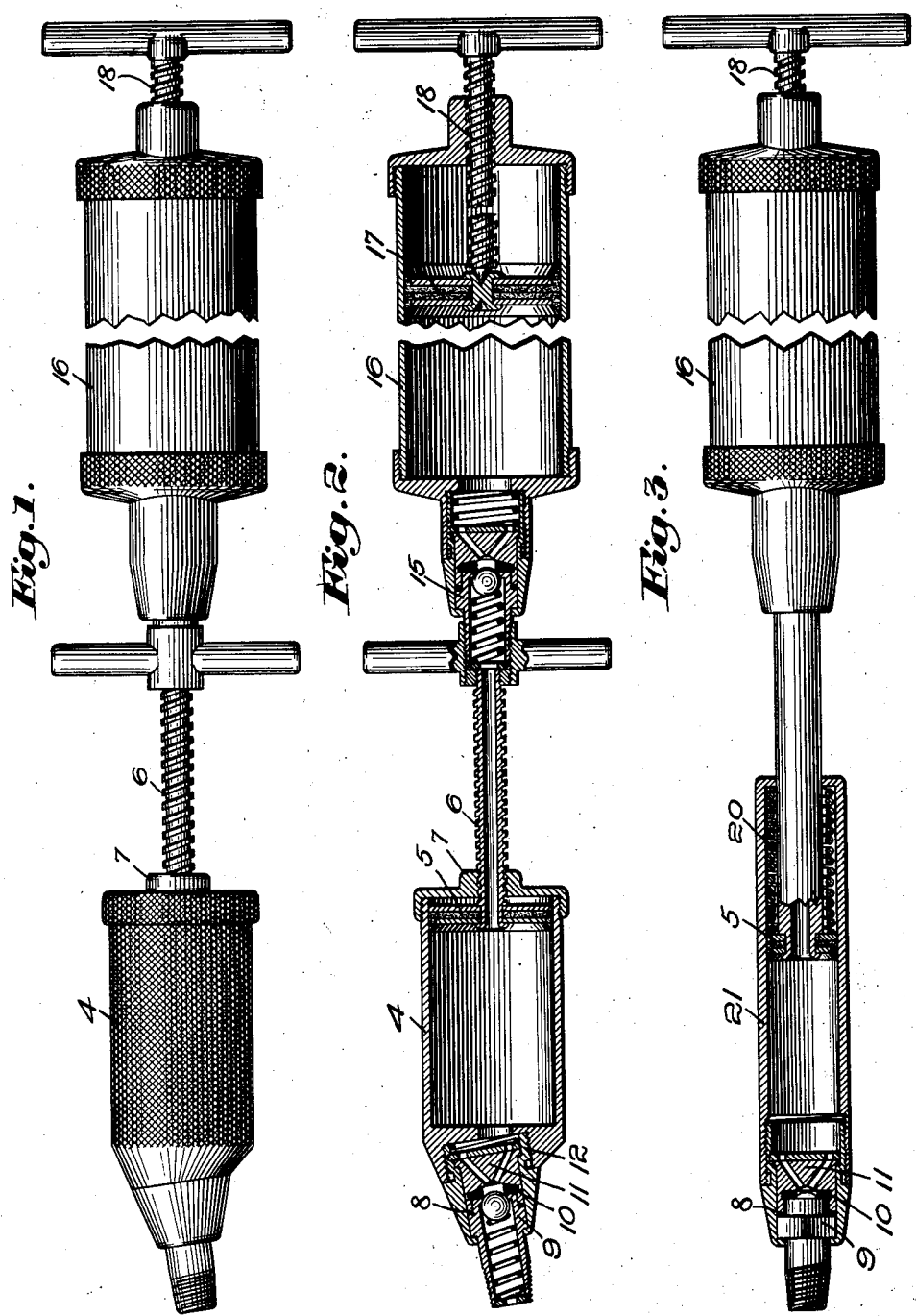

1,717,166

UNITED STATES PATENT OFFICE.

HOWARD J. MURPHY, OF READING, MASSACHUSETTS, ASSIGNOR, BY MESNE ASSIGNMENTS, TO ALEMITE MANUFACTURING CORPORATION, OF CHICAGO, ILLINOIS, A CORPORATION OF DELAWARE.

LUBRICATING SYSTEM AND APPARATUS.

Application filed March 14, 1922. Serial No. 543,646.

This invention pertains to improvements in lubricating apparatus, and more particularly to lubricating apparatus of the type in which the lubricant is delivered under pressure to the part to be lubricated. It is among the objects of the invention to provide a lubricant expelling device of superior convenience in operation.

Referring to the drawings and to the preferred form of my invention selected for illustrative purposes:—

Figure 1 is a side elevation of one embodiment of a preferred form of my invention;

Fig. 2 is a longitudinal section through the apparatus illustrated in Fig. 1, being partly in elevation; and Fig. 3 is a side elevation of a modified form of my invention, being partly in section.

Referring to Figures 1 and 2 of the drawings showing a preferred form of my invention selected for illustrative purposes, I have shown a lubricant expelling device including a barrel 4 from which lubricant may be expelled by a piston 5 actuated in any suitable way but preferably, as illustrated, by the screw threaded stem 6 fitting a threaded aperture in the head 7 of the expelling device. As the piston 5 is moved toward the left as viewed from Fig. 2, pressure is exerted on the lubricant within the barrel 4 tending to expel it from the nozzle 8 of the expelling device. The preferred form of nozzle illustrated includes a coupling of the type illustrated in my co-pending application Serial No. 543,643 filed March 14, 1922, adapted to engage the lubricant receiving nipple 9 of the type illustrated in said co-pending application. The nozzle may include the sealing disc 10 and rotary valve mechanism 11, 12 similar to that illustrated in my co-pending application above referred to. For convenience in operation and application to lubricant receiving nipples located in more or less inaccessible places, the axis of the nozzle is preferably, as illustrated, slightly angled relative to the axis of the barrel 4 and the expelling device is preferably relatively small.

In the preferred form of my invention illustrated, a charging device is provided for loading the lubricant expelling device, this charging device preferably being provided with a nozzle including a valved coupling similar to that herein previously described and adapted to engage over a lubricant receiving nipple 15 preferably similar to the lubricant receiving nipple 9 but mounted at the end of the stem 6. The charging means preferably takes the form of a second lubricant expelling device very considerably larger than the lubricant expelling device first described. This charging device may be used either to force lubricant into the lubricant expelling device having the barrel 4 through the hollow stem thereof or for coupling direct to nipples on the more accessible parts to be lubricated, the smaller lubricant expelling device being reserved, if desired, for use on the more inaccessible nipples, while the second lubricant expelling device may include a barrel 16 having a piston 17 reciprocable therein and a screw-threaded stem 18 adapted to press against the piston 17 in grease-expelling direction. When it is desired to fill the barrel 16 with grease, the screw-threaded stem 18 may be screwed to the extreme rear of the end of the device, after which the valved coupling may be engaged with a source of grease under pressure having an outlet similar to the nipples 9 and 15 except for the fact that the ball check valves are omitted therefrom. When the valved coupling at the end of the barrel 16 is coupled to this nipple and turned, the valve will be open, thus admitting grease under pressure into what is normally the discharge end of the barrel 16, this grease forcing the piston 17 toward the rear end of the barrel and resulting in a complete filling of the barrel with grease without the trouble which might otherwise arise from the pocketing of air in front the piston 17. My invention may also be used as a unitary high and low pressure lubricant expelling device or compressor wherein the larger lubricant expelling device 16 functions as a low pressure compressor for delivering a greater quantity of lubricant at a relatively lower pressure and the lubricant expelling device 4 operates as a high pressure compressor for delivering a lesser quantity of lubricant at a relatively higher pressure.

In Fig. 3, I have shown a modification of my invention wherein the piston 5, instead of being actuated by a screw-threaded stem as in Figs. 1 and 2, is actuated by a spring 20 which is compressed as the piston 5 is forced back in the barrel 21 during the charging thereof with lubricant from a lubricant-expelling or charging device similar to that shown in cross-section in Fig. 2. This form of my invention is more specifically claimed in my divisional application, Serial No. 286,986, filed June 20, 1928.

The "floating piston" 17 and separable stem 18 illustrated in Fig. 2 are also advantageous in that the handle and stem may be removed to admit of compact storage of the gun even when filled with lubricant. If the handle were not removable, the gun would occupy nearly double the length when filled.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims:

1. Lubricating apparatus comprising, in combination, a lubricant-expelling device, charging means for said device including a second lubricant-expelling device and coupling means for securing said devices together during the charging operation, said first-named expelling device including a piston and a hollow piston rod through which lubricant is received from said second-named expelling device.

2. A compressor comprising a low pressure cylinder having a discharge conduit including a plunger tube, the inner end of which communicates with said low pressure cylinder, a high pressure cylinder slidably and rotatably mounted on said plunger tube, an outwardly opening check valve between said low and said high pressure cylinders, a coupling member secured to the outer end of said high pressure cylinder.

3. A compressor comprising a low pressure cylinder having a discharge conduit including a plunger, a high pressure cylinder slidably and rotatably mounted on said plunger, and a coupling member secured to the outer end of said high pressure cylinder.

4. A lubricant compressor comprising a low pressure cylinder and a high pressure cylinder having aligned axes and movable relatively to each other, a plunger carried by said low pressure cylinder and reciprocable in said high pressure cylinder, and a piston in said low pressure cylinder having a piston rod, the outer end of which is provided with a handle for actuating said piston and said plunger.

5. A lubricant compressor comprising a low pressure cylinder and a high pressure cylinder having aligned axes, a piston in said low pressure cylinder, a plunger in said high pressure cylinder, and common means connected with said low pressure piston for alternately moving said piston and said plunger in the same direction for displacing lubricant from the respective cylinders.

6. A lubricant compressor comprising a low pressure cylinder having a lubricant expelling piston for contacting with the lubricant in said low pressure cylinder, and slidable substantially the entire length of said low pressure cylinder, a piston rod connected with said piston and extending outwardly through one end of said low pressure cylinder, a cap for the opposite end of said low pressure cylinder, a high pressure cylinder supported by said cap, a discharge conduit for said high pressure cylinder, a plunger slidable in said high pressure cylinder, and a handle for actuating said plunger, said handle being located substantially in line with said piston rod.

7. A compressor comprising a low pressure cylinder having a discharge conduit including a plunger tube, the inner end of which communicates with said low pressure cylinder, a high pressure cylinder slidably and rotatably mounted on said plunger tube, and a coupling member secured to the outer end of said high pressure cylinder.

8. A compressor comprising a low pressure cylinder having a discharge conduit including a plunger tube, the inner end of which communicates with said low pressure cylinder, a high pressure cylinder slidably mounted on said plunger tube, and a coupling member secured to the outer end of said high pressure cylinder.

9. A compressor comprising a low pressure cylinder having a discharge conduit including a plunger tube, the inner end of which communicates with said low pressure cylinder, a high pressure cylinder slidably mounted on said plunger tube, an outwardly opening check valve between said low and said high pressure cylinders, and a coupling member secured to the outer end of said high pressure cylinder.

10. A lubricant compressor comprising a barrel having a rigid discharge conduit, a portion of said conduit intermediate its ends being threaded, a sleeve having internal threads for co-acting with the threaded portion of said conduit and a bore for receiving the outer end of said conduit, the outer end of said sleeve being provided with means for making a sealed connection with a lubricant receptacle, a piston in said barrel, and rotatable means for moving said piston inwardly in said barrel.

11. A lubricant compressor comprising a barrel having a rigid discharge conduit, means secured to the outer end of said discharge conduit for making a sealed connection with a lubricant receptacle, said means comprising a cylinder, means for causing said discharge conduit to advance into said cylinder upon rotation of said barrel, means for preventing the pressure developed in said cylinder from being communicated to said barrel, and means in said barrel for placing the lubricant therein under initial pressure.

12. A lubricant compressor comprising a barrel having a rigid discharge conduit, means mounted upon the outer end of said discharge conduit for forming a cylinder for receiving the outer end of said discharge conduit and for making a sealed connection with a lubricant receptacle, and means actuated by rotation of said barrel for advancing said discharge conduit into said cylinder.

13. A lubricant compressor comprising a barrel, means in said barrel for placing lubricant therein under pressure, a cylinder communicating with said barrel, and means in said cylinder actuated by the rotation of said barrel for placing the lubricant in said cylinder under increased pressure.

14. A lubricant compressor comprising a barrel having a piston therein, a screw threaded rod connected with said piston and extending outwardly through one wall of said barrel, a cylinder communicating with said barrel, and means actuated by the continued rotation of said piston rod for placing the lubricant in said cylinder under pressure greater than that created in said barrel by the rotation of said piston rod.

15. A lubricant compressor comprising a barrel, a piston in said barrel, a screw threaded piston rod connected with said piston and extending outwardly through one wall of said barrel, a cylinder extending from and communicating with said barrel, and means actuated by the continued rotation of said piston rod for placing the lubricant in said compressor under greater pressure than can be easily obtained by the rotation of said piston rod in said barrel.

16. A lubricant compressor comprising a barrel, a cylinder communicating with said barrel and having means for making a mechanical connection with a lubricant receptacle, said means being such as to prevent rotation thereof relative to said receptacle, a piston in said barrel, a second piston in said cylinder, and a single rotatable means for actuating said pistons.

17. A portable high pressure lubricant compressor of the class described comprising in combination a low pressure cylinder, a high pressure cylinder supplied therefrom, a piston in each of said cylinders, a single handle for operating both of said pistons, and coupling means for connecting said high pressure cylinder with a part to be lubricated.

18. Lubricating apparatus of the class described comprising high and low pressure compressing means, said high pressure compressing means supplied from said low pressure compressing means, valve means between said high and low pressure compressing means to prevent the pressure created in said high pressure means from being exerted on said low pressure means, means for connecting said compressing means with a part to be lubricated, and a single handle operable in one direction to actuate both of said compressing means.

19. A portable high pressure lubricant compressor of the class described comprising the low pressure cylinder having a piston therein, high pressure compressing means supplied from said low pressure means, coupling means for connecting said high pressure compressing means with a lubricant receiving nipple, and a single handle for operating said low pressure piston, said high pressure compressing means, and connecting said coupling means with the nipple to be lubricated.

20. A lubricant compressor comprising a conduit, manually operable means movable relatively to one end of said conduit for supplying lubricant thereto under low pressure, a force pump connected with said conduit for receiving lubricant from said conduit and discharging said lubricant under high pressure, and common means for actuating either said lubricant supplying or said discharging means.

In testimony whereof, I have signed my name to this specification.

HOWARD J. MURPHY.